United States Patent
Chu

(10) Patent No.: US 9,450,424 B2
(45) Date of Patent: Sep. 20, 2016

(54) POWER PROVIDING EQUIPMENT, MOBILE DEVICE, OPERATING METHOD OF MOBILE DEVICE

(71) Applicant: HTC Corporation, Taoyuan (TW)

(72) Inventor: Feng-Seng Chu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/718,103

(22) Filed: May 21, 2015

(65) Prior Publication Data

US 2015/0340879 A1    Nov. 26, 2015

Related U.S. Application Data

(60) Provisional application No. 62/001,075, filed on May 21, 2014.

(51) Int. Cl.
| | |
|---|---|
| H04B 1/38 | (2015.01) |
| H02J 5/00 | (2016.01) |
| H04W 12/08 | (2009.01) |
| H04W 12/04 | (2009.01) |
| H02J 7/02 | (2016.01) |
| H04W 4/00 | (2009.01) |
| H04W 12/02 | (2009.01) |

(52) U.S. Cl.
CPC ............... *H02J 5/005* (2013.01); *H02J 5/00* (2013.01); *H02J 7/02* (2013.01); *H02J 7/025* (2013.01); *H04W 4/008* (2013.01); *H04W 12/04* (2013.01); *H04W 12/08* (2013.01); *H04W 12/02* (2013.01)

(58) Field of Classification Search
CPC .............. H02J 5/005; H02J 7/02; H02J 5/00; H02J 7/025; H04W 12/08; H04W 12/04
USPC ............ 455/573, 41.1, 414.1, 41.2, 572, 73, 455/550.1; 370/311, 104, 338; 320/108
See application file for complete search history.

(56) References Cited

U.S. PATENT DOCUMENTS

| 8,536,826 | B2 | 9/2013 | Matsuoka et al. | |
|---|---|---|---|---|
| 2011/0221391 | A1* | 9/2011 | Won | H01M 10/44 320/108 |
| 2012/0268238 | A1* | 10/2012 | Park | G07F 15/006 340/5.8 |
| 2013/0084800 | A1* | 4/2013 | Troberg | H04B 5/0037 455/41.1 |
| 2014/0292267 | A1* | 10/2014 | Ahn | H02J 7/025 320/108 |

FOREIGN PATENT DOCUMENTS

TW       201415749 A    4/2014

OTHER PUBLICATIONS

Wireless Power Consortium, "System Description, wireless power transfer," vol. 1 : Low Power, part 1, version 1.1.2, Jun. 2013.
Wireless Power Consortium, "System Description, wireless power transfer," vol. 2 : Medium Power, part I, version 0.9, rev. 8, Jun. 2013.
Corresponding Taiwanese Office Action that these art references were cited on May 11, 2016.

* cited by examiner

*Primary Examiner* — Dhaval Patel
(74) *Attorney, Agent, or Firm* — CKC & Partners Co., Ltd.

(57) ABSTRACT

An operating method includes receiving a wireless power signal from a power providing equipment; and transmitting an encoded ID to the power providing equipment, so that the power providing equipment forwards the encoded ID to a server, and the power providing equipment charges a battery of the mobile device by utilizing the wireless power signal according to a charge command provided by the server.

20 Claims, 4 Drawing Sheets

POWER PROVIDING EQUIPMENT, MOBILE DEVICE, OPERATING METHOD OF MOBILE DEVICE

RELATED APPLICATIONS

This application claims priority to U.S. Provisional Application Ser. No. 62/001,075, filed May 21, 2014, which is herein incorporated by reference.

BACKGROUND

1. Technical Field

The present disclosure relates to an electronic device and a method. More particularly, the present disclosure relates to a power providing equipment a mobile device, and an operating method of a mobile device.

2. Description of Related Art

With advances in electronic technology, wireless power systems have been widely used.

A typical wireless power system includes a power transmitter and a power receiver. When the power receiver (usually be a mobile device) approaches the power transmitter, the power transmitter can charge the power receiver. Through such an operation, it is convenience for users to charge their mobile devices without cables.

SUMMARY

One aspect of the present disclosure is related to a mobile device. accordance with one embodiment of the present disclosure, the mobile device includes a battery, a wireless power receiver, a communication transmitter, and a processor. The wireless power receiver is configured for receiving a wireless power signal from a power providing equipment. The processor electrically connected with the battery, the wireless power receiver, and the communication transmitter. The processor is configured for controlling the communication transmitter to transmit an encoded identifier (ID) to the power providing equipment, so that the power providing equipment forwards the encoded ID to a server, and the power providing equipment charges the battery of the mobile device by utilizing the wireless power signal according to a charge command from the server.

Another aspect of the present disclosure relates to a power providing equipment. In accordance with one embodiment of the present disclosure, the power providing equipment includes a wireless power transmitter, a communication transmitter, a communication receiver, and a processor. The wireless power transmitter is configured for transmitting a wireless power signal to a mobile device. The processor is electrically connected with the wireless power transmitter, a communication transmitter, and the communication receiver. The processor is configured for receiving, through the communication receiver, an encoded ID from the mobile device; controlling the communication transmitter to transmit the encoded ID to a server, so that the server verifies the encoded ID with a registration database and generates a charge command according to a verification result; receiving, through the communication receiver, the charge command from the server; and controlling the wireless power transmitter to transmit the wireless power signal to the mobile device according to the charge command so that a battery of the mobile device is charged by utilizing the wireless power signal.

Another aspect of the present disclosure relates to an operating method of a mobile device. In accordance with one embodiment of the present disclosure, the operating method includes receiving a wireless power signal from a power providing equipment; and transmitting an encoded ID to the power providing equipment, so that the power providing equipment forwards the encoded ID to a server, and the power providing equipment charges a battery of the mobile device by utilizing the wireless power signal according to a charge command provided by the server.

Through an application of one embodiment described above, the power providing equipment is not able to obtain the unique ID of the mobile device, such that the privacy of the user can be enhanced.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
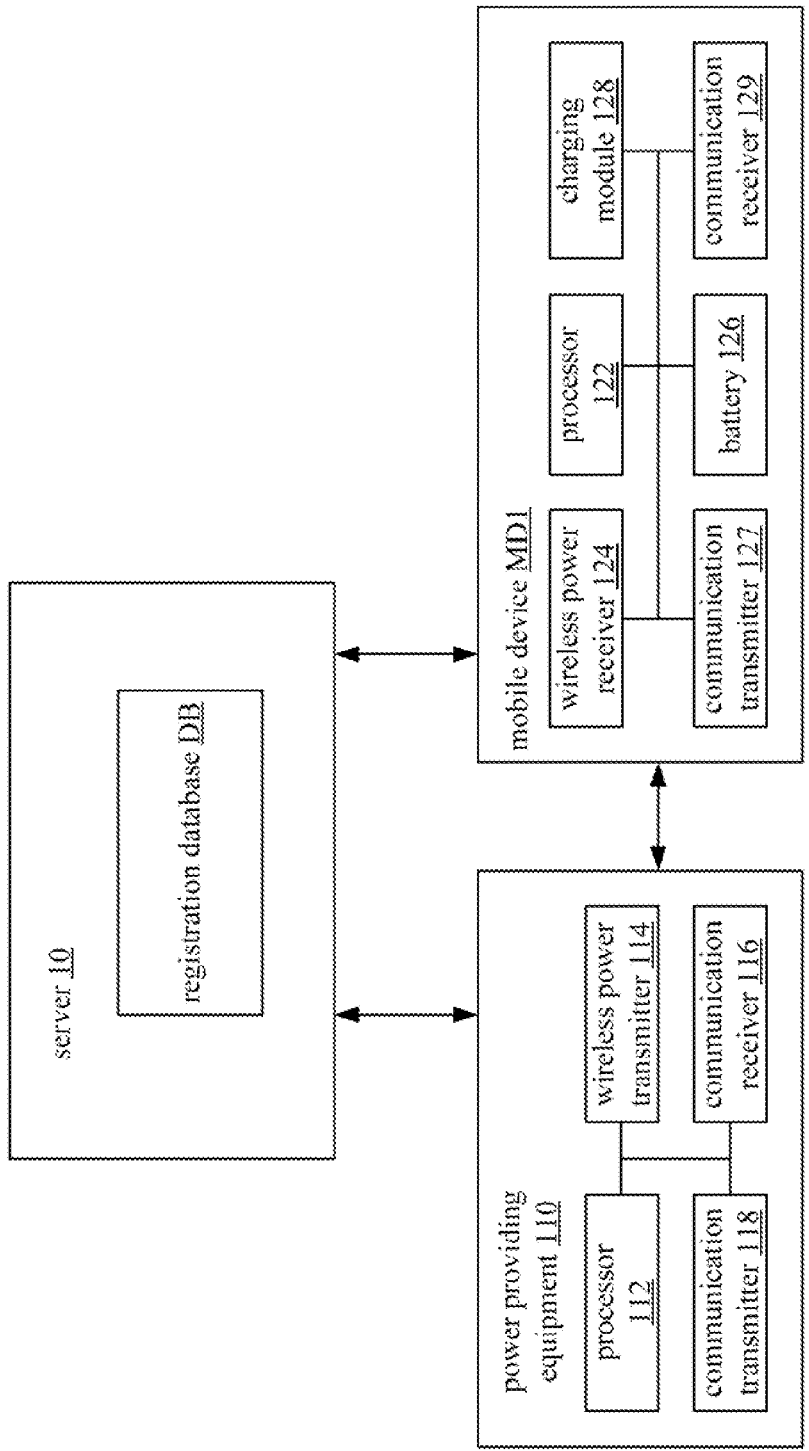
FIG. 1 illustrates a wireless power system in accordance with one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," Include or "including," "have" or "having," "contain" or "containing" and the like used herein are to be understood to be open-ended, i.e., to mean including but riot limited to.

It will be understood that, in the description herein and throughout the claims that follow, the phrase "and/or" includes any and all combinations of one or more of the associated listed items.

Any element in a claim that does not explicitly state "means for" performing a specified function, or "step for"

performing a specific function, is not to be interpreted as a "means" or "step" clause as specified in 35 U.S.C. §112(f). In particular, the use of "step of" in the claims herein is not intended to invoke the provisions of 35 U.S.C. §112(f).

One aspect of the present disclosure is related to a mobile device. In the paragraphs below, a smart phone or a tablet computer will be taken as an example to describe details of the mobile device. However, the present disclosure is not limited in this regard.

FIG. 1 illustrates a wireless power system 100 in accordance with one embodiment of the present disclosure. In this embodiment, the wireless power system 100 includes a power providing equipment 110, a server 10, and a mobile device MD1, In this embodiment, the power providing equipment 110 includes a processor 112, a wireless power transmitter 114, a communication receiver 116, and a communication transmitter 118. The processor 112, the wireless power transmitter 114, the communication receiver 116, and communication transmitter 118 are electrically connected. In this embodiment, the mobile device MD1 includes a processor 122, a wireless power receiver 124, a battery 126, a communication transmitter 127, a charging module 128 and a communication receiver 129. The processor 122, the wireless power receiver 124, the battery 126, the communication transmitter 127, the charging module 128, and the communication receiver 129 are electrically connected. The server 10 includes a registration database DB. one embodiment, each of the mobile device MD1 and the power providing equipment 110 may includes other modules such as Bluetooth low energy (BLE) module and liquid crystal display (LCD) module, but the present disclosure is not limited in this regard.

In one embodiment, the connections among the server 10, the power providing equipment 110, and the mobile device MD1, may be wire or wireless links. In one embodiment, the wire link may be realized in a core network of cellular carrier. In one embodiment, the wire link may be realized in a local private network deployed by government, company or home users. In one embodiment, the wire link may be realized in a backbone network operated by wireless charging service provider. In one embodiment, the wire link may be realized by utilizing IEEE 802.3, ADSL or another wire transmission technologies. In one embodiment, the wire link may be realized in any possible wire link, and the disclosure is not limited to the embodiments above. In one embodiment, the wireless link may be a cellular link between a base station and a mobile device, such as evolved nodeB (eNB) and a user equipment (UE) in 3GPP. In one embodiment, the wireless link may be a wifi link between an access point (AP) and a mobile device, such as IEEE 802.11 series. In one embodiment, the wireless link may be a bluetooth link. In one embodiment, the wireless link may be a near field communication (NEC) link. In one embodiment, the wireless link may be any possible wireless link.

In one embodiment, the connection between the server 10 and the power providing equipment 110 and the connection between the mobile device MDI and the power providing equipment 110 are different.

In one embodiment, each of the processors 112, 122 can be realized by, for example, a processor, such as a central processor, or a microprocessor, but is not limited in this regard. In one embodiment, each of the wireless power transmitter 114 and the wireless power receiver 124 may be realized by, for example, a coil, but is not limited in this regard. In one embodiment, each of the communication receivers 116, 129, and the communication transmitters 118, 127 may be realized by a suitable communication module, such as a wifi module, a bluebooth module, a near field communication module, a cellular link module, and/or an in-band communication module for wireless power transfer, but is not limited in this regard. In one embodiment, the charging module 128 may be realized by, for example, a circuit, but is not limited in this regard. In one embodiment, the registration database DB may be realized by a suitable storage component, such as a memory, a hard disk, and a portable storage media, but is not limited in this regard.

In one embodiment, the operations of the power providing equipment 110 and the mobile device MD1 may respectively conform to the operations of a power transmitter (PTX) and a power receiver (PRX) defined by Wireless Power Consortium (WPC), a transmitter and receiver defined by Power Matter Alliance, or a power transfer unit (PTU) and a power receiving unit (PRU) defined by Alliance for Wireless Power (A4WP).

In one embodiment, the processor 122 of the mobile device MD1 is configured to control the communication transmitter 127 to transmit a unique identifier (ID) of the mobile device MD1 to the server 10 for registration. The server 10 is configured to store the unique ID into the registration database DB. Subsequently, the processor 122 of the mobile device MD1 is configured to encode the unique to generate an encoded ID and control the communication transmitter 127 to transmit the encoded ID to the power providing equipment 110. Subsequently, the processor 112 of the power providing equipment 110 is configured to control the communication transmitter 118 to transmit the encoded ID to the server 10. Subsequently, the server 10 is configured to verify the encoded ID with the registration database DB, generate a charge command or a terminate command according to the verification result, and transmit the charge command or the terminate command to the power providing equipment 110. After receiving the charge command by utilizing the communication receiver 116, the processor 112 of the power providing equipment 110 is configured to control the wireless power transmitter 114 to transmit the wireless power signal to the mobile device MD1 according to the charge command so that the battery 126 of the mobile device MDI is charged by utilizing the wireless power signal. In addition, after receiving the terminate command by utilizing the communication receiver 116, the processor 112 of the power providing equipment 110 is configured to control the wireless power transmitter 114 not to transmit the wireless power signal to the mobile device MD1 according to the terminate command so that the battery 126 of he mobile device MD1 is not charged.

Through such operations, the power providing equipment is not able to obtain the unique ID of the mobile device MD1, such that the privacy of the user can be enhanced.

In one embodiment, the unique ID may be a bit string. In one embodiment, the identification information includes the unique ID of the mobile device MD1 or the wireless power receiver 124. In one embodiment, the unique ID is determined by the manufacturer of the mobile device MD1 or the wireless power receiver 124. In one embodiment, the unique ID includes a manufacture code and (basic/extended) device identifier. In one embodiment, the unique ID corresponds to some modules in the mobile device MD1 other than the wireless power receiver 124. In one embodiment, the unique ID corresponds to an international mobile subscriber identity (IMSI) and/or a radio network temporary identifier (RNTI) of a cellular module (not shown). In one embodiment, the unique ID corresponds to a NFC ID of a NFC module (not shown) and/or a bluetooth low energy (BLE) ID of a BLE module (not shown). In one embodiment, the server 10 may provide the unique ID to the mobile device MD1. It should be noted that, the aspect of the unique ID described above are for illustrative purpose, and other aspects are within the scope of the present disclosure.

In one embodiment, the server 10 may store an D in the registration database DB and provide the ID to the mobile device MD1 to serve as the encoded ID.

In one embodiment, the processor 122 may encode the unique ID of the mobile device MD1 to generate the encoded ID by utilizing a hash function. one embodiment, the encoded ID may be equal to the unique ID. In one embodiment, the processor 122 may encode a part of the unique ID (e.g., the last 2 bytes) to generate the encoded ID. In one embodiment, the processor 122 may encode the unique ID by utilizing a symmetric-key approach, in which the keys used by an encoder and a decoder are identical. For example, the processor 122 may execute an XOR operation to the unique ID with a key and provide the key to the server 10, so as to allow the server 10 to decode the encoded ID with the key. In one embodiment, the processor 122 may encode the unique ID by utilizing an asymmetric-key approach, in which the keys used by encoder and a decoder are different. In such an embodiment, the processor 122 may encode the unique ID by using a key received through the communication receiver 129 from the server 10 so that the server 10 is able to decode the encoded ID with the key. It should be noted that, the aspect of the encoded ID described above are for illustrative purpose, and other aspects are within the scope of the present disclosure.

In one embodiment, the key may be a bit string generated by the mobile device MD1. In one embodiment, the key may be a random variable string with a length identical to the unique ID. In one embodiment, the key may be provided by a user via a user interface (not shown). In one embodiment, the key may be a fixed value assigned by the specification. In one embodiment, the key may be a bit string which makes the encoded ID equals to the unique ID. It should be noted that, the aspect of the key described above are for illustrative purpose, and other aspects are within the scope of the present disclosure.

In one embodiment, under the condition that the registration database DB stores unique IDs, the server 10 may decode the encoded ID (by utilizing the key) received from the power providing equipment 110 to obtain the unique ID of the mobile device MD1 and check whether the unique ID matches an entry in the registration database DB. In one embodiment, under the condition that the registration database DB stores encoded IDs, the server 10 may directly check whether the encoded ID received from the power providing equipment 110 matches an entry in the registration database DB.

In one embodiment, after receiving the charge command through the communication receiver 116, the processor 112 of the power providing equipment 110 may control the wireless power transmitter 114 to transmit or continuously transmit the wireless power signal to the mobile device MD1 when the verification is passed. In one embodiment, after receiving the terminate command through the communication receiver 116, the processor 112 of the power providing equipment 110 may control the wireless power transmitter 114 to stop transmit or not transmit the wireless power signal to the mobile device MD1 when the verification is failed. In one embodiment, after receiving the terminate command through the communication receiver 116, the power providing equipment 110 may control the communication transmitter 118 to transmit a stop command to the mobile device MD1 when the verification is failed, so that the processor 122 controls the charging module 128 to stop charging the battery 124 of the mobile device MD1 according to the stop command.

In one embodiment, the processor 122 of the mobile device MD1 may control the communication transmitter 127 to transmit encode information corresponding to the encoded ID to the power providing equipment 110. In one embodiment, the encode information indicates how the key is obtained, if the symmetric or asymmetric key-based encoding is used. In one embodiment, the encode information may be a bit to indicate whether the key is provided by a the server 10 to the mobile device MD1. In one embodiment, the encode information may be a bit to indicate whether the key is generated by the mobile device MD1. In one embodiment, the encode information indicates the encoded ID is exactly encoded.

In one embodiment, the encode information may be located in a configuration packet or an identification packet transmitted in the Identification phase.

In one different embodiment, the mobile device MD1 may provide the unique ID or the encoded ID to a subscription server instead of the server 10 for registration, and the key may be provided to/from the subscription server instead of the server 10. Thus, the present disclosure is not limited to the embodiment above.

In one embodiment, the communication between the mobile device MD1 and the power providing equipment 110 may be performed via an in-band communication channel or an out-band communication channel. In one embodiment, the in-band communication channel may be a communication channel attached to the wireless power signal. In one embodiment, the in-band communication channel may be based on frequency shift keying (FSK), adopted in Qi medium power specification v1.0. In one embodiment, the in-band communication channel may be based on load modulation (LM), adopted in Qi medium power specification v1.0. In one embodiment, the out-band communication channel may be a communication channel not attached to the wireless power signal. In one embodiment, the out-band communication channel may be a BLE communication channel between the PTX and PRX adopted in A4WP specification. In one embodiment, the out-band communication channel may be a NFC, WIFI, or 3rd generation partnership project (3GPP) device to device (D2D) communication channel. It should be noted that, the aspect of the communication between the mobile device MD1 and the power providing equipment 110 described above are for illustrative purpose, and other aspects are within the scope of the present disclosure.

To facilitate the description to folio an operating method of a mobile device will be described below with reference to FIG. 2. However, the present disclosure is not limited to the embodiment below.

It should be noted that the operating method can be applied to a mobile device having a structure that is the same as or similar to the structure of the mobile device MD1 shown in FIG. 1. To simplify the description below, in the following paragraphs, the embodiment shown in FIG. 1 will be used as an example to describe the operating method according to an embodiment of the present disclosure. However, the present disclosure is not limited to application to the embodiment shown in FIG. 1.

In addition, it should be noted that in the steps of the following operating method, no particular sequence is required unless otherwise specified. Moreover, the following steps also may be performed simultaneously or the execution times thereof may at least partially overlap.

Furthermore, the steps of the following operating method may be added to, replaced, and/or eliminated as appropriate, in accordance with various embodiments of the present disclosure.

Figure 2:
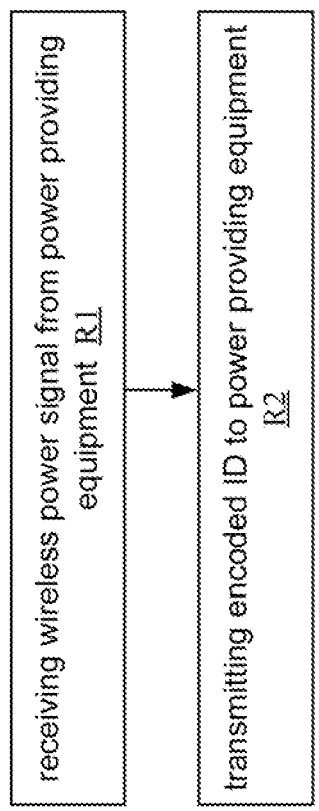
FIG. 2 is a flowchart of an operating method of a mobile device in accordance with one embodiment of the present disclosure.

Reference is made to FIG. 2. The operating method 200 includes the steps below.

In step R1, the wireless power receiver 124 of the mobile device MD1 receives a wireless power signal from the power providing equipment 110. In one embodiment, this step may be omitted. That is, the wireless power receiver 124 does not receive the wireless power signal before an encoded ID is transmitted to the power providing equipment 110 (in step R2).

In step R2, the processor 122 controls the communication transmitter 127 to transmit an encoded ID to the power providing equipment 110, so that the power providing equipment 110 forwards the encoded ID to the server 10 for verification. The server 10 transmits a charge command or a terminate command to the power providing equipment 110 according to the verification result. When the encoded ID is correct in the verification, the power providing equipment 110 receives the charge command and transmits or continuously transmits the wireless power signal to the mobile device MD1 according to the charge command, so that the battery 126 of the mobile device MD1 is charged or continuously charged by utilizing the wireless power signal. When the encoded ID is failed in the verification, the power providing equipment 110 receives the terminate command and stops transmit or does not transmit the wireless power signal to the mobile device MD1 according to the terminate command, so that the battery 126 of the mobile device MD1 stop being charged or does not be charged.

In one embodiment, the power provided to the mobile device MDl by utilizing the wireless power signal after the power providing equipment 110 receives the charge command is greater than the power provided to the mobile device MDl by utilizing the wireless power signal before the power providing equipment 110 receives the charge command.

It should be noted that, details of the operation among the power providing equipment 110, the mobile device MD1, and the server 10 can be ascertained with reference to the paragraphs above, and a description in this regard will not be repeated herein.

Through such operations, the power providing equipment is not able to obtain the unique ID of the mobile device MD1, such that the privacy of the user can be enhanced.

To facilitate the description to follow, an operating method of a power providing equipment will be described below with reference to FIG. 3. However, the present disclosure is not limited to the embodiment below.

It should be noted that the operating method can be applied to a power providing equipment having a structure that is the same as or similar to the structure of the power providing equipment 110 shown in FIG. 1. To simplify the description below, in the following paragraphs, the embodiment shown in FIG. 1 will be used as an example to describe the operating method according to an embodiment of the present disclosure. However, the present disclosure is not limited to application to the embodiment shown in FIG. 1.

In addition, it should be noted that in the steps of the following operating method, no particular sequence is required unless otherwise specified Moreover, the following steps also may be performed simultaneously or the execution times thereof may at least partially overlap.

Furthermore, the steps of the following operating method may be added to, replaced, and/or eliminated as appropriate, in accordance with various embodiments of the present disclosure.

Figure 3:
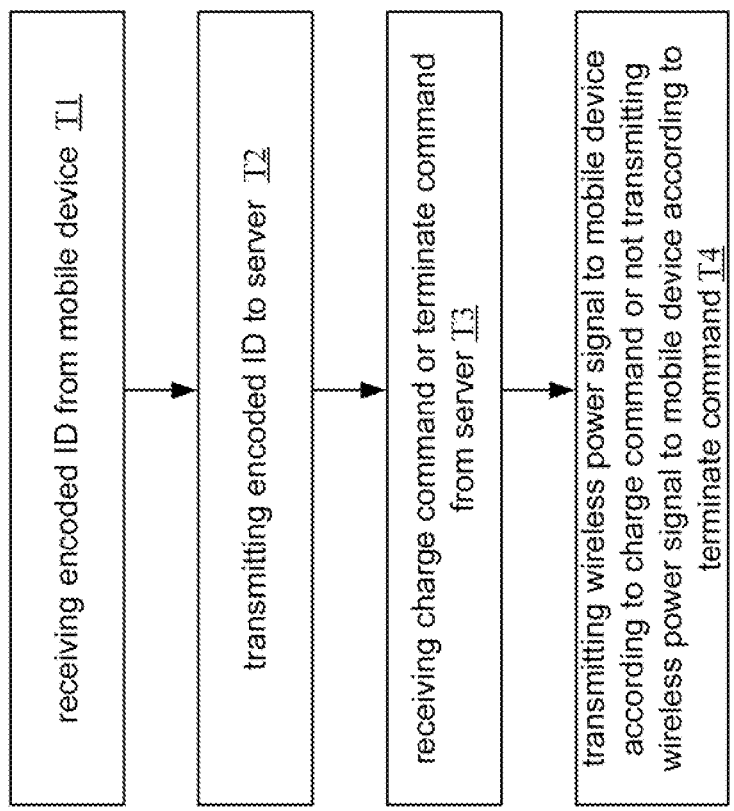
FIG. 3 is a flowchart of an operating method of a power providing equipment in accordance with one embodiment of the present disclosure.

Reference is made to FIG. 3. The operating method 300 includes the steps below.

In step T1, the processor 112 of the power providing equipment 110 receives the encoded ID from the mobile device MD1 through the communication receiver 116. Details of the encoded ID can be ascertained with reference to the paragraphs described above, and a description in this regard will not be repeated.

In step T2, the processor 112 of the power providing equipment 110 controls the communication transmitter 118 to transmit the encoded ID to the server 10 so that the server 10 verifies the encoded ID with the registration database DB in the server 10 and generates a charge command or a terminate command according to a verification result. Details of the verification can be ascertained with reference to the paragraphs described above, and a description in this regard will not be repeated.

In step T3, the processor 112 of the power providing equipment 110 receives the charge command or the terminate command from the server 10 through the communication receiver 116.

In step T4, when the charge command is received, the processor 112 of the power providing equipment 110 controls the wireless power transmitter 114 to transmits or continuously transmits the wireless power signal to the mobile device according to the charge command, so that the battery 126 of the mobile device MD1 is charged or continuously charged by utilizing the wireless power signal. In addition, when the terminate command is received, the power providing equipment 110 stops transmit or does not transmit the wireless power signal to the mobile device MD1 according to the terminate command, so that the battery 126 of the mobile device MD1 stop being charged or does not be charged. Details of the operations of the processor 112 in this regard can be ascertained with reference to the paragraphs described above, and a description in this regard will not be repeated.

Through such operations, the power providing equipment is not able to obtain the unique ID of the mobile device MD1, such that the privacy of the user can be enhanced.

Figure 4:
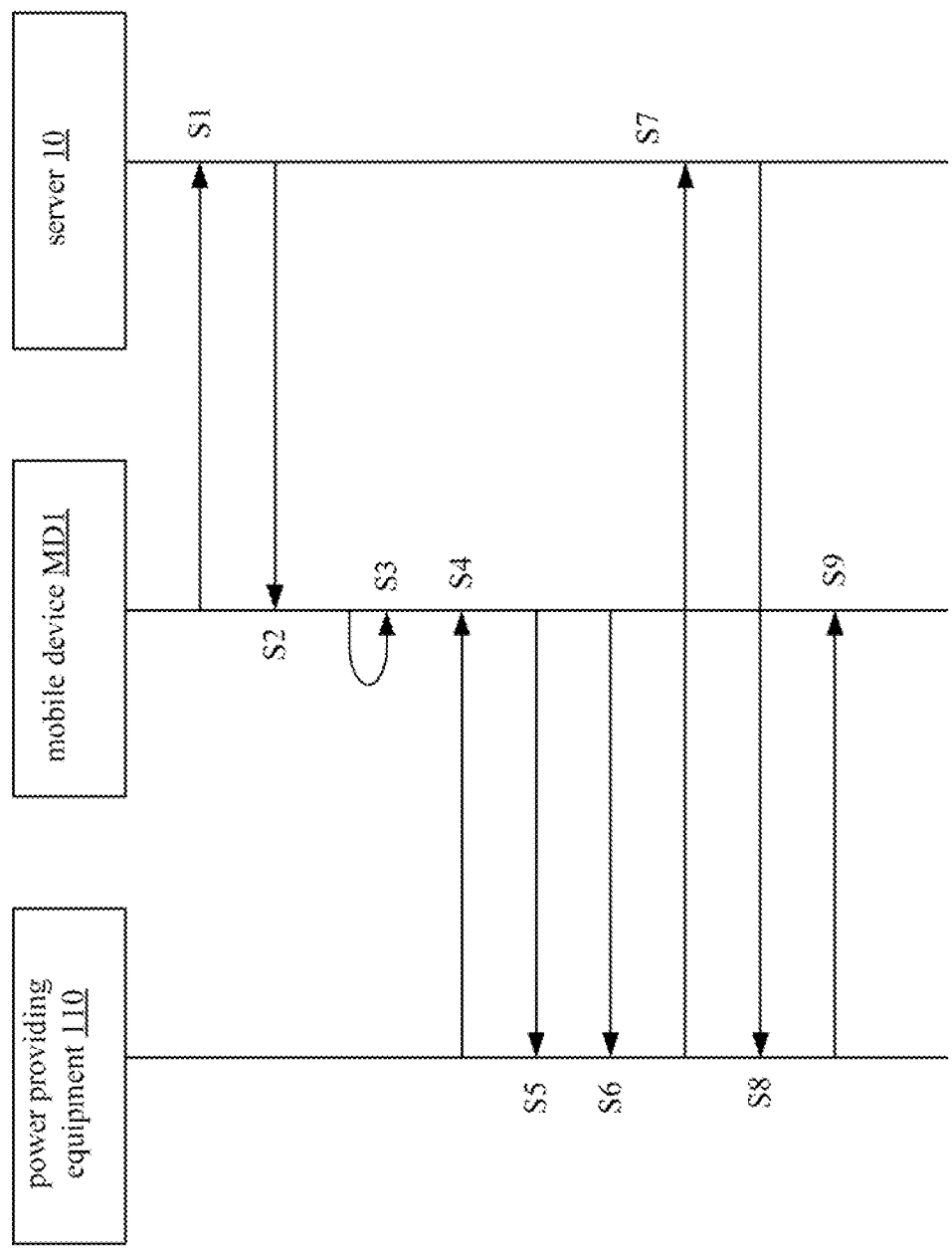
FIG. 4 illustrates operations in a wireless power system in accordance with one embodiment of the present disclosure.

To facilitate the description to follow an operative example will be described in the paragraphs below with reference to FIG. 4. However, the present disclosure is not limited to the embodiment below.

In this operative example, the operations in the wireless power system 10 are outlined below.

In operation S1, the processor 122 of the mobile device MD1 controls the communication transmitter 127 to transmit a unique ID of the mobile device MD1 to the server 10 for registration and subscribing a wireless charge service.

In operation S2, the server 10 stores the unique ID into the registration database DB and returns a key to the mobile device MD1.

In operation S3, the processor 122 of the mobile device MD1 encodes the unique ID of the mobile device MD1 according to the key to generate an encoded ID. For example, if the unique ID is "0010110101100011" and the key is "1110001000111100", the processor 122 may perform an XOR operation with the unique ID and the key to generate the encoded ID with "1100111101011111".

In operation S4, the processor 112 of the power providing equipment 110 controls the wireless power transmitter 114 to transmit a wireless power signal with a limited power to the mobile device MD1 come closing to the power providing equipment 110.

In operation S5, the processor 122 of the mobile device MD1 controls the communication transmitter 127 to transmit the encoded ID to the power providing equipment 110.

In operation S6, the processor 122 of the mobile device MD1 controls the communication transmitter 127 to transmit encoding information to the power providing equipment 110. The encoding information indicates the encoded ID transmitted is encoded, and the encoded ID should be forwarded to the server 10.

In operation S7, the processor 112 of the power providing equipment 110 controls the communication transmitter 118 to forward the encoded ID to the server 10.

In operation S8, the server 10 decodes the encoded ID to generate the unique ID of the mobile device MD1, verifies the unique ID with the registration database DB, and transmits a charge command to the power providing equipment 110 in response to the successful verification.

In operation S9, the processor 112 of the power providing equipment 110 controls the wireless power transmitter 114 to continuously transmit the wireless power signal with a sufficient power to the mobile device MD1 to continuously charge the battery 126 of the mobile device MD1 according to the charge command.

Through such operations, the power providing equipment s not able to obtain the unique ID of the mobile device MD1, such that the privacy of the user can be enhanced.

Although the present invention has been described in considerable detail with reference to certain embodiments thereof, other embodiments are possible. Therefore, the scope of the appended claims should not be limited to the description of the embodiments contained herein.

What is claimed is:

1. A mobile device comprises:
a battery;
a wireless power receiver configured for receiving a wireless power signal from a power providing, equipment;
a communication transmitter: and
a processor electrically connected with the battery, the wireless power receiver, and the communication transmitter, wherein the processor is configured for:
controlling the communication transmitter to transmit an encoded identifier (ID), which is encoded for privacy and is not able to be decoded by the power providing equipment, to the power providing equipment, so that the power providing equipment forwards the encoded ID to a server, and the power providing equipment charges the battery of the mobile device by utilizing the wireless power signal according to a charge command from the server.

2. The mobile device as claimed in claim 1, wherein the processor is further configured for:
encoding a unique ID to generate the encoded ID.

3. The mobile device as claimed in claim 2, wherein the processor is further configured for:
encoding the unique ID to generate the encoded ID according to a key; and
transmitting the key to the server.

4. The mobile device as claimed in claim 2, wherein the processor is further configured for:
receiving a key from the server; and
encoding the unique ID to generate the encoded ID according to the key.

5. The mobile device as claimed, in claim 1, wherein the processor is further configured for:
receiving the encoded ID from the server.

6. The mobile device as claimed in claim 1, wherein the processor is further configured for:
controlling the communication transmitter to transmit encode information corresponding to the encoded ID to the power providing equipment, wherein the encode information indicates whether a key used to encode a unique ID to generate the encoded ID is received from the server or is generated by the mobile device.

7. The mobile device as claimed, in claim 1, wherein the processor is further configured for:
controlling the communication transmitter to transmit encode information corresponding to the encoded ID to the power providing equipment, wherein the encode information indicates the encoded ID is encoded.

8. A power providing equipment comprises:
a wireless power transmitter configured for transmitting a wireless power signal to a mobile device;
a communication transmitter:
a communication receiver; and
a processor electrically connected with the wireless power transmitter, the communication transmitter, and the communication receiver, wherein the processor is configured for:
receiving, through the communication receiver, an encoded ID from the mobile device, wherein the encoded ID is encoded for privacy and is not able to be decoded by the power providing equipment;
controlling the communication transmitter to transmit the encoded ID to a server, so that the server verifies the encoded ID with a registration database and generates a charge command according to a verification result;
receiving, through the communication receiver, the charge command from the server; and
controlling the wireless power transmitter to transmit the wireless power signal to the mobile device according to the charge command so that a battery of the mobile device is charged by utilizing the wireless power signal.

9. The power providing equipment as claimed in claim 8, Wherein the processor is configured for:
receiving, through the communication receiver, encode information corresponding to the encoded ID from the mobile device, wherein the encode information indicates whether a key used to encode a unique ID to generate the encoded ID is received from the server or is generated by the mobile device.

10. The power providing equipment as claimed in claim 8, wherein the processor is configured for:
receiving, through the communication receiver, encode information corresponding to the encoded ID from the mobile device, wherein the encode information indicates the encoded ID is encoded.

11. The power providing equipment as claimed in claim 8, wherein the processor is configured for:
controlling the wireless power transmitter to stop transmitting, or not to transmit the wireless power signal to the mobile device according to the charge command.

12. The power providing equipment as claimed in claim 8, wherein the processor is configured for:
controlling the communication transmitter to transmit a stop command to the mobile device, so that the mobile device stops charging the battery of the mobile device according to the stop command.

13. The power providing equipment as claimed in claim 8, wherein the processor is configured for:

controlling the wireless power transmitter to supply a first power by utilizing the wireless power signal before receiving the charge command; and controlling the wireless power transmitter to supply a second power by utilizing the wireless power signal after receiving the charge command, wherein the second power is greater than the first power.

14. An operating method of a mobile device comprising:

receiving a wireless power signal from a power providing equipment; and transmitting an encoded ID, which is encoded for privacy and is not able to be decoded by the power providing equipment, to the power providing equipment, so that the power providing equipment forwards the encoded ID to a server, and the power providing equipment charges a battery of the mobile device by utilizing the wireless power signal according to a charge command provided by the server.

15. The operating method as claimed in claim 14 further comprising:

encoding a unique ID to generate the encoded ID.

16. The operating method as claimed in claim 15, wherein the step of encoding the unique ID to generate the encoded ID further comprises:

encoding a unique ID to generate the encoded ID according to a key;

and wherein the operating method further comprises:

transmitting the key to the server.

17. The operating method as claimed in claim 15 further comprising:

receiving a key from the server:

wherein the step of encoding the unique ID to generate the encoded ID further comprises:

encoding a unique ID to generate the encoded ID according to the key.

18. The operating method as claimed in claim 14 further comprising:

receiving the encoded ID from the server.

19. The operating method as claimed in claim 14 further comprising:

transmitting encode information corresponding to the encoded ID to the power providing equipment, wherein the encode information indicates whether a key used to encode a unique ID to generate the encoded ID is received from the server or is generated by the mobile device.

20. The operating method as claimed in claim 14 further comprising:

transmitting encode information corresponding to the encoded ID to the power providing equipment, wherein the encode information indicates the encoded ID is encoded.

* * * * *